United States Patent [19]

Wiesler

[11] 4,072,201
[45] Feb. 7, 1978

[54] DIGITAL WEIGHING MACHINE

[76] Inventor: Mordechai Wiesler, 6 Carmel Circle, Lexington, Mass. 02173

[21] Appl. No.: 683,902

[22] Filed: May 6, 1976

[51] Int. Cl.² .............................................. G01G 3/00
[52] U.S. Cl. ......................... 177/210 R; 177/DIG. 3; 177/DIG. 6; 250/231 SE
[58] Field of Search ...... 177/210 R, DIG. 6, DIG. 3, 177/DIG. 2; 250/231 SE, 231 R; 346/11, 12

[56] References Cited

U.S. PATENT DOCUMENTS

| 1,893,243 | 1/1933 | Rees | 346/12 |
| 2,404,562 | 7/1946 | Barnes | 346/11 |
| 3,853,191 | 12/1974 | Yamagiwa | 177/210 R |

Primary Examiner—Joseph W. Hartary
Attorney, Agent, or Firm—Morse, Altman, Oates & Bello

[57] ABSTRACT

A weighing machine with a digital display and having a lever and coded disc that rotate about a common axis. The disc is constrained to rotate in the direction of the lever after a preset time delay, the lever rotating a distance related to the weight of an object placed on the machine. Indicia on the disc are counted during the time interval between initiation of disc rotation and the striking of a contact on the disc with a contact on the lever, the number of counts defining the weight of the object.

13 Claims, 7 Drawing Figures

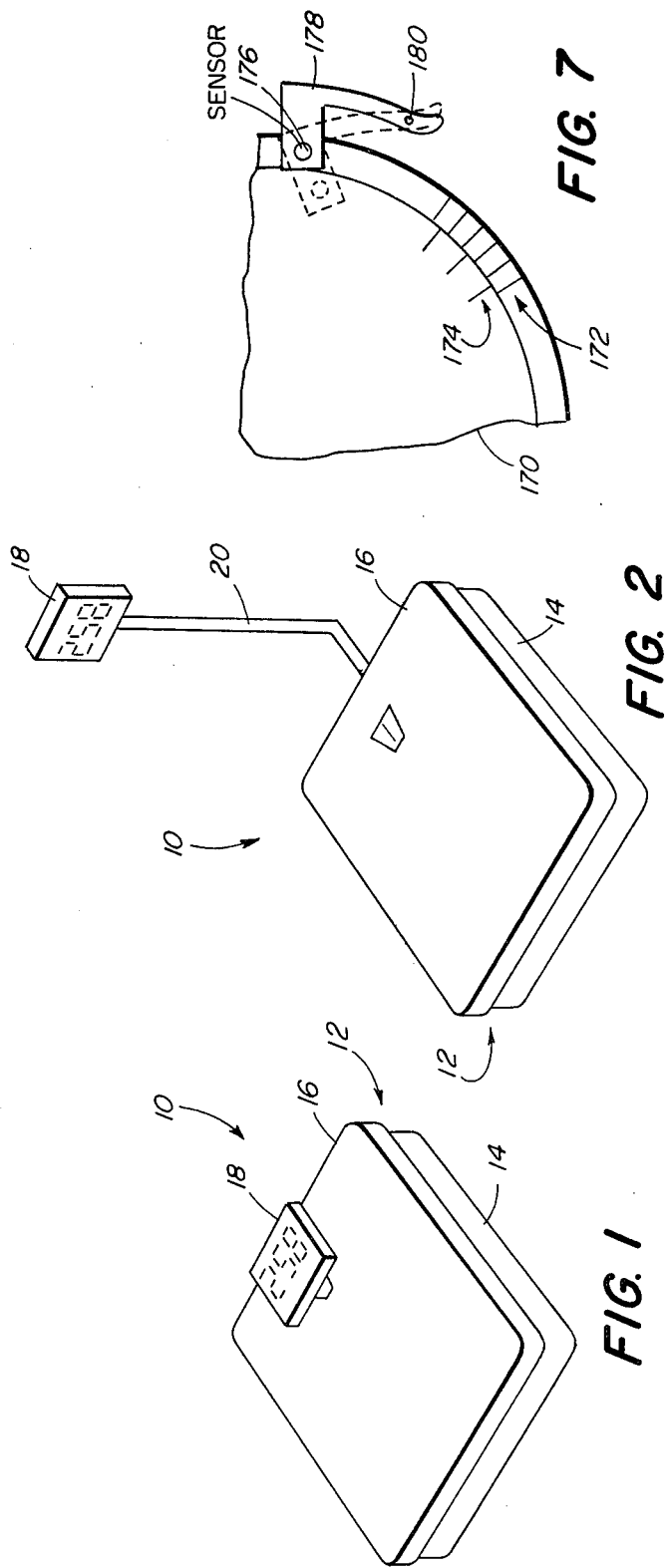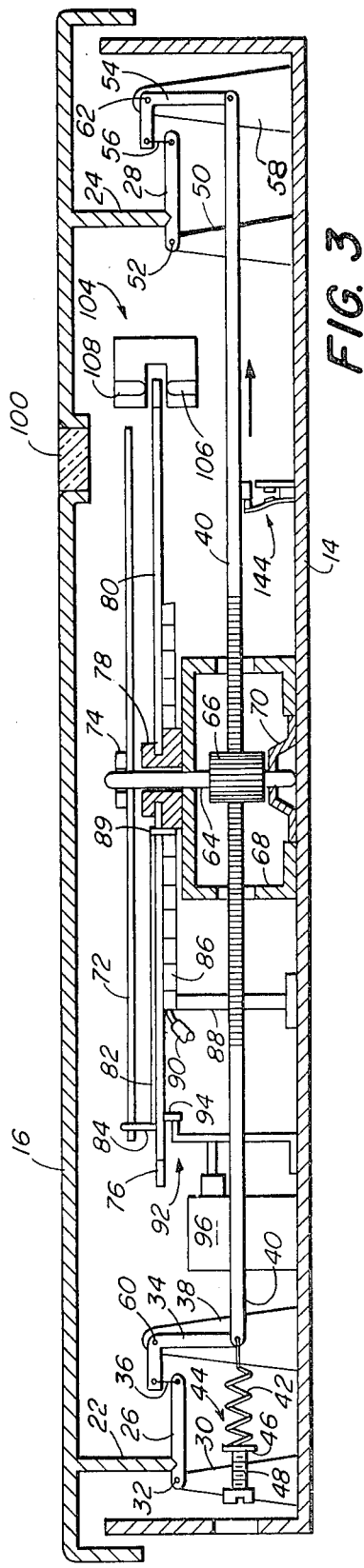

DIGITAL WEIGHING MACHINE

BACKGROUND OF THE INVENTION

1. Field of Invention

The present invention relates to weighing machines, and more particularly, is directed towards weighing machines with digital displays

2. Description of the Prior Art

Many weighing machines or scales which have been designed with digital displays have been introduced with varying degrees of success. A digital display weighing machine is shown in U.S. Pat. No. 3,853,191. In scales having an indicator disc or pointer mounted to a rotatably shaft, one approach is to connect an analog type position detector, such as a potentiometer or other encoder, to the shaft and to convert the angular shaft position to a decimal output by means of an analog to digital converter. This approach has the disadvantages that, in addition to the analog to digital converter circuitry being complex and costly, the position detector imposes drag on the system and impairs its accuracy. Another approach is to provide photo-electric detectors for sensing the angular position of a coded disc mounted to the shaft. A unique pattern provided on the coded disc is sensed for each disc position. This approach has the disadvantage that it requires a multiplicity of sensors in order to convert the code to a digital display. Still a further approach is to sense the direction of disc rotation and to specify the digital value of the final disc position by employing up/down counters. This approach has the disadvantage of requiring complex and costly sensing devices and circuitry.

SUMMARY OF THE INVENTION

It is an object of the present invention to provide an improved weighing machine with a digital display which does not suffer from the heretofore disadvantages. The weighing machine includes a lever and coded disc that are rotatable about a common axis. The disc, which is provided with indicia, is constrained to rotate in the direction of the lever after a preset time interval. An object to be weighed is placed on the machine and the lever rotates a distance related to the weight of the object. After the present time delay, the disc is rotated and the coded indicia is detected by a single detector during the time interval between initiation of the disc rotation and the striking of a contact on the disc with a contact on the lever. The detected indicia is processed in an up counter. The number of counts, which represent the weight of the object, is applied to a digital display for presentation.

Another object of this invention is to provide an improved weighing scale which does not impose any external inhibiting forces on the weighing mechanism and in which graduations on a disc are sensed by a single sensor.

Yet another object of the invention is to provide a digital weighing scale in which a graduated disc provides weight information by means of a single one-way pass through a sensor and a simple up counter.

Other objects of the present invention will in part be obvious and will in part appear hereinafter.

The invention accordingly comprises the apparatuses and systems, together with their parts, elements and interrelationships that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein:

FIG. 1 is a perspective view of a weighing machine embodying the invention;

FIG. 2 is a perspective view of an alternate embodiment of FIG. 1 with a remote display;

FIG. 3 is a cross sectional view showing the mechanical construction of the weighing machine;

FIG. 7 is a plan view of a two track coded disc and associated sensor.

DETAILED DESCRIPTION OF THE PREFERRED EMBODIMENTS

Figure 4:
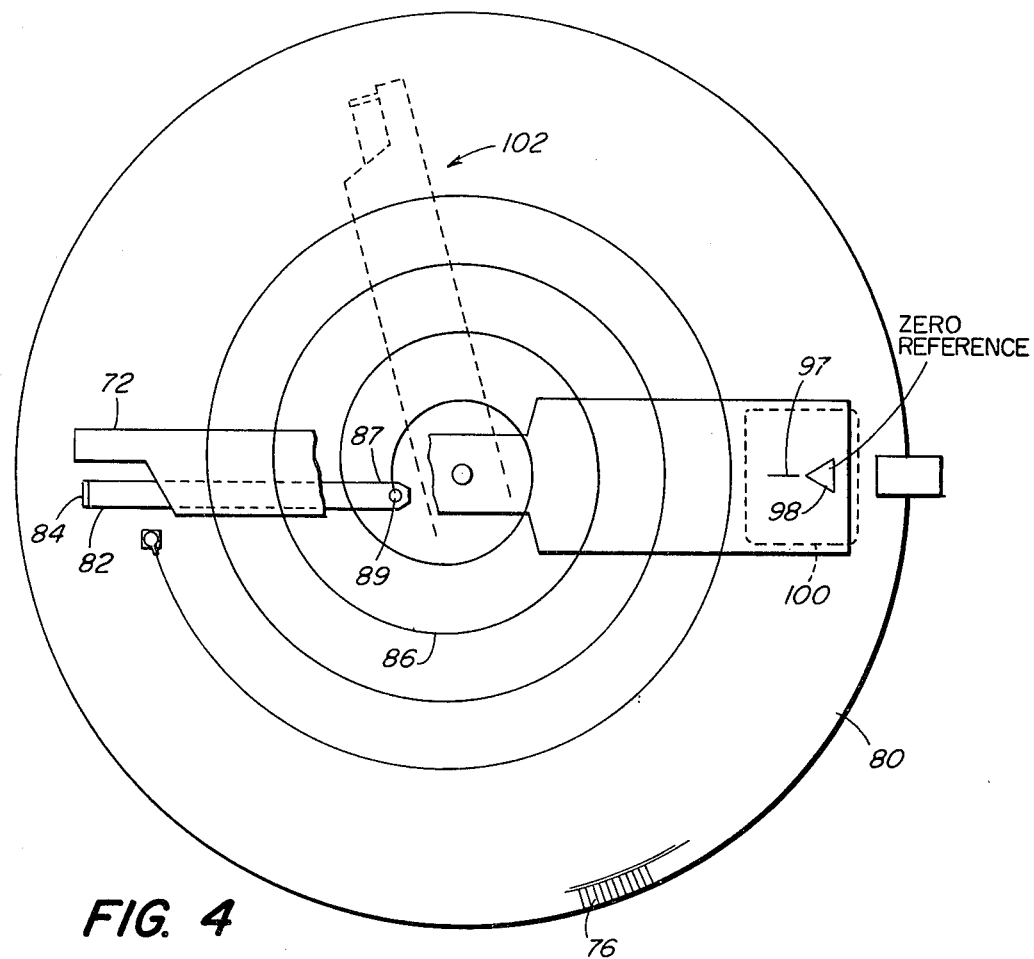
FIG. 4 is a top plan view of FIG. 3 with certain components removed.

Referring now to the drawings, FIGS. 1 and 2 show alternate embodiments of a weighing machine 10 which includes a body 12 having a base 14 and a movable platform 16. In FIG. 1, an indicator display 18 is mounted directly to platform 16. In the alternate embodiment of FIG. 2, indicator display 18 is mounted remote from weighing machine 10 on a brace 20, suitable electrical connection being provided between the weighing machine and the display. When a person mounts weighing platform 16 or an object is placed thereon, the platform moves downwardly by an amount corresponding to the weight placed on the platform which in turn provides a digital presentation on display 18.

As shown in FIG. 3, platform 16 is provided with a pair of projections 22 and 24 which are supported on levers 26 and 28, respectively. One end of lever 26 is pivotally mounted to a bracket 30 that is secured to base 14, lever 26 pivoted about a pin 32. The other end of lever 26 is connected to one end of a crank arm 34 by a link 36, the crank arm being carried on a bracket 38. The other end of crank arm 34 is connected to one end of a rack 40. A bias member 42, for example a spring, is connected between rack 40 and an adjusting mechanism 44 comprising a movable plate 46 and a screw 48. One end of lever 28 is pivotally mounted to a bracket 50 that is fastened to base 14, the lever being pivoted about a pin 52. The other end of lever 28 is connected to one end of a crank arm 54 by a link 56, the crank arm being carried on a bracket 58. The other end of crank arm 54 is connected to the other end of rack 40. The arrangement of levers 26, 28 and crank arms 34, 54 is such that when the force transmitted by descending motion of platform 16 is applied on the levers, crank arms 34 and 54 rotate clockwise about axes 60 and 62, respectively. The rotational movement of crank arms 34 and 54 is converted into linear movement of rack 40 which rotates a shaft 64 connected to a pinion 66. Shaft 64 is freely received within a housing 68 and is journaled in a bearing 70. A lever arm 72 is mounted to a free end of shaft 64 by a fastener 74. Shaft 64 and lever arm 72 are composed of an electrically conductive material such as steel, an electrical path being established between the lever arm to base 14 or ground through the shaft. A bearing 78, in which a coded disc 80 is free to rotate about the axis of shaft 64, is mounted to housing 68. The periphery of disc 80 is provided with means for generating electrical pulses as the disc rotates relative to a sensor 104. In the illustrated embodiment, disc 80 is composed of a light weight opaque material, for example an opaque plastic material that is formed with a series of slots 76 about its periphery (FIG. 4). In an alternative embodiment, disc 80 is composed of a light weight transparent material, such as a transparent plastic material, and is provided with a series of printed lines about its periphery. In either embodiment, the periphery of disc 80 is made to be alternately opaque and transparent and sensor 104 is a photo-electric sensor. In a further embodiment, disc 80 is provided with a series of spaced magnetic bars and sensor 104 is a magnetically actuated sensor that generates a pulse for each magnetic bar passing the sensor.

A metallic contract strip 82, FIG. 4, which terminates in an upwardly extending arm 84 is connected to disc 80. The height of arm 84 is such that it contacts lever arm 72. Disc 80 is biased to rotate in a clockwise direction by means of a bias element 86 such as a spiral spring. An end 87 of the spring 86 is electrically connected to contact strip 82 by a pin 89. The other end of spring 86 is connected to a post 88 which is mounted to base 14. Post 88 is composed of an electrical insulating material. An electric conductor 90, for example electric wires, are connected to the free end of spring 86.

Disc 80 is prevented from freely rotating in the clockwise direction under the influence of spring 86 by a catch 92 which engages a pin 94 connected to the disc. Catch 92 is in turn connected to an actuator 96, for example an electric solenoid. When an electric pulse is applied to solenoid 96, catch 92 is moved out of contact with pin 94, whereby disc 80 is free to rotate in a clockwise direction under the influence of spring 86.

As previously indicated, lever arm 72 is constrained to rotate with shaft 64 under the influence of a weight place on platform 16. Lever arm 72 is shown at its initial or zero position in FIG. 4. In order to facilitate zeroing of weighing machine 10 by adjusting mechanism 44, a zero line 97 is provided on lever arm 72 and a reference mark 98 is provided on a window 100 in platform 16. With no weight on platform 16, screw 48 is turned until zero line 97 and reference mark 98 are aligned. When a weight is placed on platform 16, shaft 64 rotates clockwise and lever arm 72 moves to an angular position 102 indicated by the dashed lines. When lever arm 72 has reached this angular position which is directly related to the weight placed on platform 16, actuator 96 is energized and catch 92 is moved out of contact with pin 94. In consequence, disc 80 is free to rotate in a clockwise direction until contact 84 strikes lever arm 72. At this time, a grounded signal is presented on wires 90, an electrical path being established from base 14, through shaft 64, lever arm 72, contact strip 82, pin 89 and spring 86.

As disc 80 rotates, its alternately opaque and transparent periphery is detected by photo-electric sensor 104 which includes a light source 106 such as a light-emitting-diode and a light sensor 108 such as a photo-transistor. Light-emitting-diode 106 and photo-transistor 108 are disposed in optical alignment with one another at opposite faces of disc 80. As disc 80 rotates, sensor 104 generates a series of pulses which correspond to the passage of the alternately opaque and transparent sections in the optical path between light-emitting-diode 106 and photo-transistor 108. That is, a light beam generated by light-emitting-diode 106 and directed towards photo-transistor 108 is interrupted as each opaque section passes through the optical path. In the illustrated embodiment, one pulse is generated either for each slot 76 or for each opaque section. The number of slots 76 or the number of opaque sections in a given arcuate distance along the periphery of disc 80 corresponds to the number of pounds, or other weight unit such as kilograms for example, causing a point on the disc to move that distance. The number of pulses generated by sensor 104 is applied to counter and display electronics 109 shown in FIG. 5.

Figure 5:
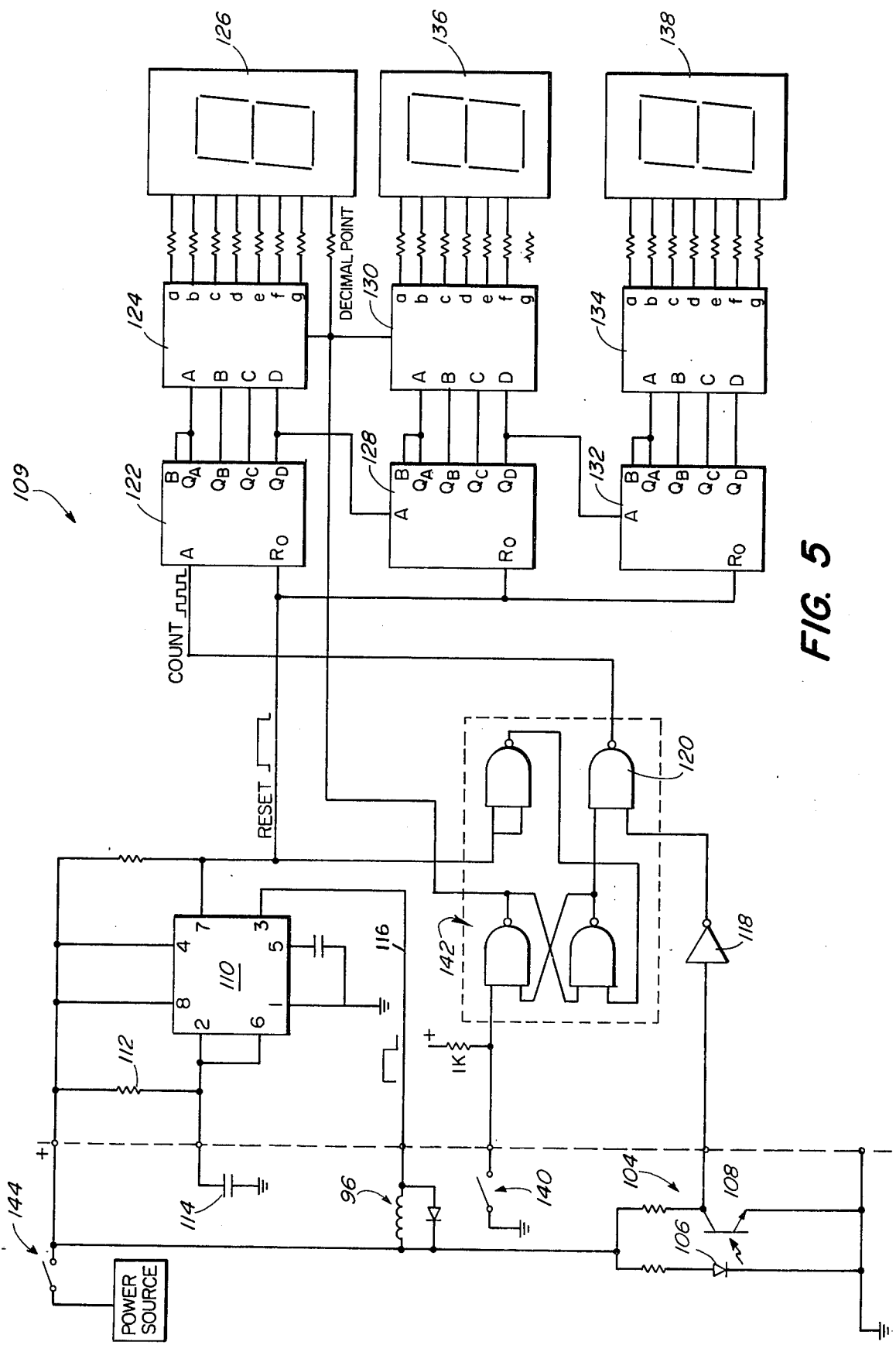
FIG. 5 is a block and schematic diagram of the electronic circuitry of the weighing machine.

One of the objects of this invention, which is to overcome the problem of system oscillations during the weighing process, is achieved by preventing the counting process from taking place until oscillations have stopped. The weighing process is initiated by a weight which is placed on platform 16. The various lingages shown in FIG. 3 cause shaft 64 to rotate which carries lever arm 72 to angular position 102, for example. Because of inertia effects, lever arm 72 oscilates for a short time. As shown in FIG. 5, during this time, electronic activity is inhibited by means of timing circuit 110, for example an integrated timing circuit such as IC555. The time delay duration of circuit 110, which is controlled by a resistor 112 and a capacitor 114, provides sufficient time delay for the oscillations to stop, for example a time delay in the range of 1 second to 6 seconds, preferably 3 seconds to 5 second. At the end of the time delay, a signal appears on a line 116 which energizes actuator 96 and releases pin 94. Disc 80 rotates and sensor 104 generates a series of pulses. The pulses are shaped by a Schmitt trigger 118 and are passed by a gate 120 to a counter 122 for example BCD counter such as IC 7490. Counter 122 is connected to a code converter 124 which converts the BCD code to a seven-segment code allowing a seven segment display 126 to show the desired number. Counters 128, 130 and their associated code converters 132, 134, respectively, are provided for presenting additional digits on display 136 and 138. In the illustrated embodiment, displays 126, 136 and 138 are the units, tens and hundreds digits, respectively.

As disc 80 completes its rotation, arm 84 contacts lever arm 72 and establishes a contact to ground, this contact being represented in FIG. 5 by a switch 140. When contact is made, a latch 142 is fired instantly causing all counting to stop by an inhibiting signal to gate 120. In this manner the last number displayed corresponds to the exact position of the lever arm 72. In order to consume current only during the weighing operation, a switch 144 is provided to energize the circuit. Switch 144 is actuated by movement of the weighing linkage 40 when a weight is placed on the platform 16. Actuation of the switch 144, starts timing circuit 110. Counters 122, 128, 132 and latch 142 are reset to their appropriate starting states by the signal generated by the timing circuit and applied thereto.

Figure 6:
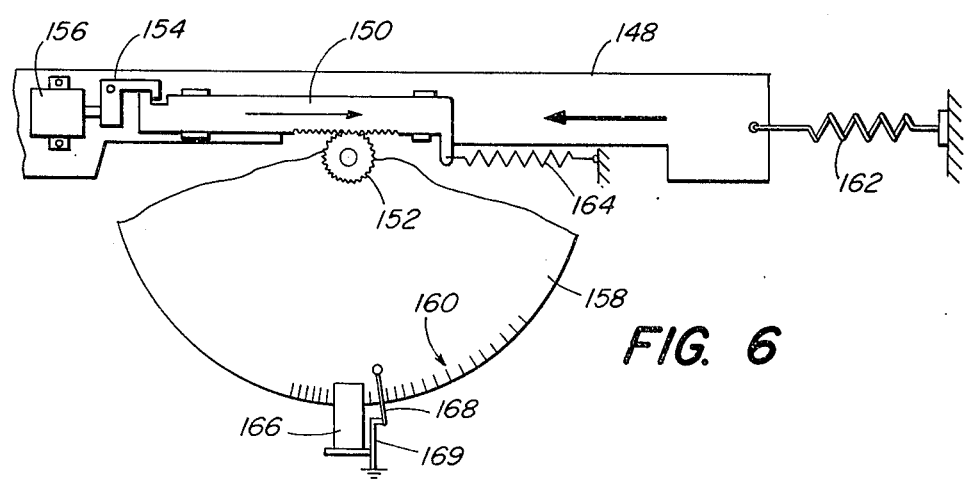
FIG. 6 is a plan view of the mechanical components in an alternate embodiment of the invention.

Although the invention has been described in connection with the rotational movement of a pair of rotatable members, it is to be understood that the principles herein involved are applicable to linear movement as well as rotational movement. In an alternative embodiment shown in FIG. 6, movement of platform 16 moves a carriage 148 towards the left. A rack 150, which engages a pinion 152, is slidably mounted to carriage 148. A catch 154 that is controlled by an actuator 156 holds rack 150 against movement with respect to carriage 148. A disc 158 having coded indicia 160 for generating electrical pulses of the type herein described in connection with coded disc 80 is captively held to pinion 152. During a weighing operation, carriage 148 moves towards the left against the biasing effect of a spring 162. Rack 150, which is held against sliding movement relative to carriage 148 by catch 154, is carried by the carriage against the force of a spring 164. As rack 150 moves, pinion 152 rotates conterclockwise and disc 158 follows the counterclockwise rotation of pinion 152. After a time delay of the type described in connection with weighing machine 10, actuator 156 is energized, whereby catch 154 disengages rack 150. Rack 150 moves towards the right under the bias of spring 164. In consequence, pinion 152 and disc 158 rotate clockwise towards their initial position. During this clockwise rotation, a sensor 166 detects indicia 160 and generates counting pulses. As in the case of weighing machine 10, the pulses are counted until a ground path is established by the contacting of a finger 168 on disc 158 with a grounded contact 169.

Referring to FIG. 7, a further variation to the embodiment is provided to allow for displaying weight in different units such as pounds and kilograms. A disc 170, which is interchangeable with discs 80 and 160, is provided with a plurality of concentric groups of graduations 172 and 174. In the illustrated embodiment, by way of example, the spacing of graduations 172 corresponds to a pound unit of weight while the spacing of graduations 174 is such that each graduation corresponds to a kilogram unit of weight. A sensor body 176 is mounted to a lever 178 pivotally mounted to the scale body by a pivot 180. Lever 178 allows placing sensor 176 to sense the graduations 172 or when moved to a position shown in the dotted line to sense graduations 174. In this manner, the counting circuit counts and displays the number corresponding to the weight unit corresponding to the selected graduations.

Since certain changes may be made in the foregoing disclosure without departing from the scope of the invention herein involved, it is intended that all matter contained in the above description and depicted in the accompanying drawings be construed in an illustrative an not in a limiting sense.

What is claimed is:

1. A weighing machine comprising:
   a. base means;
   b. platform means constrained for movement on said base means in response to the weight of an object set thereon;
   c. first mechanical means constrained for movement on said base means in response to said movement of said platform means;
   d. second mechanical means constrained for movement on said base means in response to said movement of said platform means;
   e. said movement of said first mechanical means stopping, after the occurrence of any oscillations, at a rest position and providing a first event that is functionally related to said weight;
   f. delay means responsive to said movement of said platform means for producing a second event substantially after the termination of any of said oscillations;
   g. said movement of said second mechanical means being initiated by said second event and being related to said movement of said first mechanical means;
   h. electronic means for presenting indicia representing said movement of said second mechanical means;
   i. said electronic means being controlled by a relationship between said first and second members.

2. The weighing machine as claimed in claim 1 wherein said second mechanical means is a disc having alternately opaque and transparent sections about its periphery.

3. The weighing machine as claimed in claim 2 wherein said electronic means is a photo-electric sensor including a light source and a light detector, said light source and said light detector disposed on opposite faces at the periphery of said disc in optical alignment.

4. The weighing machine as claimed in claim 2 wherein said electronic means includes an electric actuator and wherein said disc includes a projecting arm that is engaged by said actuator when said actuator is in its first state.

5. A weighing machine comprising:
   a. a first member movable in a first direction in response to the descending movement of a weighing platform;
   b. a second member biased for movement in said first direction;
   c. generating means associated with said second member for generating a series of pulses, the number of said pulses corresponding to the amount of said second member movement;
   d. control means having first and second states for engagement and disengagement, respectively, with said second member, said second member fixed against movement when engaged by said control means, said second member moving in said first direction when disengaged by said control means, said control means in its first state in engagement with said second member as said first member moves from an initial starting position to a weighing position in response to the descending movement of the weighing platform, said control means changing to its second state and disengaging said second member at a preset time interval after said first member has moved from said starting position, said disengaged second member moving in said first direction and contacting said first member at said weighing position, said generating means generating a predetermined number of pulses corresponding to the amount of said second member movement until said second member contacts said first member; and
   e. processing means operatively connected to said generating means for counting the number of said pulses generated and for displaying an indication of said count which represents a weight placed on the weighing platform;
   f. said first member and said second member being rotatable on a common shaft, a contact strip mounted to said second member, an electrical path established between said first member and said processing means through said contact strip when said second member contacts said first member, said generating means generating pulses until said electrical path is established.

6. A weighing machine comprising:
   a. a base;
   b. a weighing platform constrained for movement relative to said base;

c. a first member having a rotation in first direction in response to a descending movement of said weighing platform;
d. a second member biased for rotation in said first direction;
e. generating means associated with said second member for generating a series of pulses, the number of said pulses corresponding to the amount of said second member rotation;
f. control means having first and second states for engagement and disengagement, respectively, with said second member, said second member fixed against rotation when engaged by said control means, said second member rotating in said first direction when disengaged by said control means, said control means in its first state when said first member is rotated in said first direction from a start position to a weighing position in response to a weight placed on said weighing platform, said control means changing to its second state a preset time interval after said first member has rotated from said starting position and disengaging said second member, said second member rotating in said first direction when disengaged by said control means, said second member contacting said first member at said weighing position, said generating means generating a predetermined number of pulses corresponding to said rotation of said second member, said pulses generated only during the time interval between initiation of said rotation of said second member and contact of said first member and said second member; and
g. processing means operatively connected to said generating means for counting said pulses and for presenting an indication of the number of said counted pulse which represents the weight placed on said weighing platform.

7. The weighing machine as claimed in claim 6 including a rotatable shaft operatively connected to said weighing platform and said base, said shaft rotating in said first direction in response to the descending movement of said weighing platform, said first member fixed to said shaft, said second member rotatable about said shaft, said shaft and said first and second members having a common rotational axis.

8. The weighing machine as claimed in claim 7 wherein said second member is a disc having alternately opaque and transparent sections about its periphery and wherein said generating means includes photo-electric sensor means having a light sensor and a light detector disposed in optical alignment on opposite faces of said disc, said light source generating a light beam which is directed towards said light detector, said opaque sections interrupting said light beam directed towards said light detector.

9. The weighing machine as claimed in claim 7 wherein said second member is a disc having a contact strip mounted thereto, said disc composed of an electrically non-conductive material, said contact strip, said shaft and said first member composed of an electrically conductive material, an electrical path established from said contact strip to said shaft through said first member when said second member contacts said first member, said generating means generating said pulses until said electrical path is established.

10. The weighing machine as claimed in claim 9 wherein said control means includes an actuator and wherein said disc includes a projection, said actuator configured to engage and disengage said projection, said disc fixed against rotation when said actuator engages said projection, said disc rotating in said first direction when said projection and said actuator are disengaged.

11. The weighing machine as claimed in claim 6 wherein said first member is a lever arm and wherein said second member is a disc having at least two concentric rows of coded indicia about its periphery and wherein said generating means includes a photoelectric sensor movable into excluse alignment with each said row of coded indicia, one of said rows corresponding to a first weight unit and the other of said rows corresponding to a different weight unit.

12. A weighing machine comprising:
a. weighing station means configured to receive an object to be weighed, said weighing station means constrained for movement in response to the weight of the object received by said weighing station means;
b. first member means operatively connected to said weighing station means and constrained for movement along a first path in response to movement of said weighing station means, said first member means moving a first distance related to the weight of the object to be weighed;
c. second member means operatively connected to said weighing station means and constrained for movement along a second path, said second member means moving a distance related to the weight of the object to be weighed;
d. electronic means responsive to movement of said first member means and said second member means, said electronic means generating a first signal when said first member means has traveled said first distance, said second member means moving along said second path after said first member has traveled said first distance along said first path, said first distance constituting a reference distance, said second distance constituting a measurement distance which is related to said reference distance and the weight of the object to be weighed, said electronic means generating a second signal when said second member means has traveled said measurement distance along said second path; and
e. display means for presenting indicia representing said measurement distance movement of said second member along said second path.

13. A weighing machine comprising:
a. a base;
b. a weighing platform constrained for movement relative to said base;
c. a first member movable in a first direction in response to a movement of said weighing platform;
d. a second member biased for movement in said first directon;
e. generating means associated with said second member for generating a series of pulses, the number of said pulses corresponding to the amount of said second member movement;
f. control means having first and second states for engagement and disengagement respectively, with said second member, said second member fixed against movement when engaged by said control means, said second member moving in said first direction when disengaged by said control means, said control means in its first state when said first member is moved in said first direction from a start position to a weighing position in response to a weight placed on said weighing platform, said control means changing to its second state a preset time interval after said first member has moved from said starting positon and disengaging said second member, said second member moving in said first direction when disengaged by said control means, said second member contacting said first member at said weighing position, said generating means generating a predetermined number of pulses corresponding to said movement of said second member; and g. processing means operatively connected to said generating means for counting said pulses during the time interval between initiation of said movement of said second member and contact of said first member and said second member, and for presenting an indication of the number of said counted pulses which represents the weight placed on said weighing platform.

* * * * *